United States Patent
Pleskot (10) Patent No.: US 9,022,477 B2
(45) Date of Patent: May 5, 2015

(54) ADJUSTMENT SYSTEM, VEHICLE SEAT, VEHICLE AND METHOD THEREFOR

(71) Applicant: GM Global Technology Operations LLC, Detroit, MI (US)

(72) Inventor: Andrzej Pleskot, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 13/748,846

(22) Filed: Jan. 24, 2013

(65) Prior Publication Data

US 2013/0187424 A1 Jul. 25, 2013

(30) Foreign Application Priority Data

Jan. 25, 2012 (DE) .......................... 10 2012 001 278

(51) Int. Cl.
| | |
|---|---|
| B60N 2/12 | (2006.01) |
| B60N 2/16 | (2006.01) |
| B60N 2/18 | (2006.01) |
| B60N 2/20 | (2006.01) |
| B60N 2/22 | (2006.01) |
| B60N 2/06 | (2006.01) |
| B60N 2/02 | (2006.01) |
| B60N 2/235 | (2006.01) |

(52) U.S. Cl.
CPC .. *B60N 2/02* (2013.01); *B60N 2/22* (2013.01); *B60N 2/06* (2013.01); *B60N 2/2356* (2013.01)

(58) Field of Classification Search
USPC .................... 297/361.1, 358, 463.1
See application file for complete search history.

(56) References Cited

U.S. PATENT DOCUMENTS

| | | | | |
|---|---|---|---|---|
| 4,653,807 | A  * | 3/1987 | Hirose et al. ............... | 297/367 R |
| 4,830,433 | A | 5/1989 | Takahashi | |
| 6,279,982 | B1 | 8/2001 | Nishimura et al. | |
| 7,862,121 | B2 * | 1/2011 | Ishijima et al. ........... | 297/367 R |
| 7,938,490 | B2 * | 5/2011 | Ishijima et al. ............... | 297/358 |
| 7,959,229 | B2 * | 6/2011 | Ishijima et al. ............... | 297/358 |
| 8,162,404 | B2 * | 4/2012 | Ueda .......................... | 297/463.1 |
| 8,353,561 | B2 * | 1/2013 | Yamazaki et al. ........ | 297/452.38 |
| 8,678,507 | B2 * | 3/2014 | Yamazaki et al. ......... | 297/463.1 |
| 2009/0026791 | A1 * | 1/2009 | Ishijima et al. ......... | 297/361.1 X |
| 2009/0026825 | A1 * | 1/2009 | Ishijima et al. ............... | 297/358 |
| 2009/0058158 | A1 * | 3/2009 | Sobieski .................... | 297/358 X |
| 2010/0109406 | A1 * | 5/2010 | Ueda ............................. | 297/358 |

FOREIGN PATENT DOCUMENTS

| | | |
|---|---|---|
| DE | 10223792 C1 | 12/2003 |
| DE | 102007036450 B3 | 1/2009 |
| FR | 2935313 A1 | 3/2010 |
| JP | 2010057524 A | 3/2010 |
| JP | 2010184667 A | 8/2010 |
| JP | 2011063049 A | 3/2011 |
| WO | 2006124674 A2 | 11/2006 |

* cited by examiner

*Primary Examiner* — Rodney B White
(74) *Attorney, Agent, or Firm* — Ingrassia, Fisher & Lorenz (57) ABSTRACT

An adjustment system for repeated adjustment of a vehicle seat having a seat part and a support element are provided. The adjustment system includes a seat actuation unit for adjusting a seat position of the seat part and a support actuation unit for adjusting a support position of the support element. The seat actuation unit and the support actuation unit are arranged in a common reach area and are positioned next to each other. A vehicle seat using the adjustment system, a vehicle having the vehicle seat, and a method for making multiple adjustments to a vehicle seat via the adjustment system also are provided.

12 Claims, 3 Drawing Sheets

ADJUSTMENT SYSTEM, VEHICLE SEAT, VEHICLE AND METHOD THEREFOR

CROSS-REFERENCE TO RELATED APPLICATION

This application claims priority to German Patent Application No. 10 2012 001 278.0, filed Jan. 25, 2012, which is incorporated herein by reference in its entirety.

TECHNICAL FIELD

The technical field relates to an adjustment system for making multiple adjustments to a vehicle seat, a vehicle seat using the adjustment system, a vehicle having the vehicle seat, and a method for making multiple adjustments to a vehicle seat via the adjustment system.

BACKGROUND

Vehicles having seats in which it is possible to make multiple adjustments to the vehicle seat are known from the related art. In particular, it is known with vehicle seats to adjust a seat part and to adjust a backrest relative to the seat part. In this context, the seat part of the vehicle seat may be adjusted vertically, that is to say the seat part may be adjusted to positions at various distances from a vehicle floor. The backrest may also be adjusted in terms of an angle thereof relative to the seat part, that is to say the backrest is pivotable towards the seat part and relative thereto about an axis of rotation. Various mechanisms are known for this adjustment. The mechanisms are actuated to make the adjustment via one operating or actuating unit each. In the known solutions, the operating unit for adjusting the height is located on the side of the seat part. The operating unit for adjusting the backrest is located in the area of the axis of rotation about which the backrest is pivotable or swivelable, to one side of the backrest. The two actuating units are therefore disposed at a distance from one another.

The backrest is adjusted via a lever mechanism arranged on the seat or via another actuating device fixed thereon. In this respect, stepless adjustments via actuators and discontinuous adjustment, that is to say stepped adjustment, via mechanical solutions are known. In the case of the mechanical adjustments, a locking or detent arrangement must be released in order to enable the adjustment, and must be locked to fix the adjustment. This is performed by means of a lever via which a force is transmitted to a ratcheted recliner mechanism. In this case, force is transmitted proportionally, that is to say a force to be transmitted increases with the distance travelled by the lever, or in the case of a rotary movement the turning moment increases with the angle of rotation. Due to intermediate positions of the ratcheted recliner mechanisms it is possible to make an adjustment when the ratcheted recliner mechanism is not fully released. If an adjustment is made in such intermediate position, undesirable side effects such as noise or increased wear occur.

From DE 38 00 924 C2 A is known a vehicle seat having an adjustment device for a backrest. The adjustment device comprises a fixed position bearing block, a swivel arm that is supported pivotably on the bearing block and is attached to the backrest and may be fixed in selectable angular positions via a locking device. The adjustment device is covered by a covering element in the direction facing the seat occupant. The bearing block is fastened to the seat part and the other parts of the adjustment device are arranged inside the backrest and connected thereto. The covering element is connected permanently to a part of the adjustment device and has a slot into which an upwardly protruding portion of the bearing block enters when the backrest is tilted forwards.

The actuating device for the known adjustment device is arranged directly on the seat that is to be adjusted, in the area of the axis of rotation. The arrangement for actuation is not ergonomic and is difficult to reach in conditions of limited space. Moreover, one adjustment characteristic is inconvenient for the user. The user or users must reach round in order to operate the seat adjustment.

Accordingly, at least one object herein is to provide a solution that offers a simpler, more convenient way to make an adjustment. In particular, to this end it is at least one object to provide a vehicle, a vehicle seat, an adjustment device and a method with which operating convenience when adjusting a seat is improved.

SUMMARY

An adjustment system for repeated adjustment of a vehicle seat is provided. Particularly an adjustment system with a discontinuous support adjustment device for adjusting a support element or a backrest, more precisely a position of the backrest or a backrest position is provided. In an embodiment, a seat adjustment device for adjusting a seat part, more precisely a position of the seat part or the seat position, of a driver's seat, includes at least one seat actuation unit for adjusting a seat position and at least one support actuation unit for adjusting a support position. The actuation units are arranged in a common reaching range so that the actuation units are positioned next to each other. The adjustment devices comprise an adjustment mechanism and at least one actuation unit coupled with each other. In this way, at least one of the adjustment devices, particularly the support adjustment device is of non-electronic or non-electrical design, but rather mechanical and/or hydraulic or pneumatic.

The adjustment system is configured for adjusting the vehicle seat in multiple degrees of freedom and/or directions, in both translational and rotational manner. In particular, the adjustment system is configured to adjust the height of the vehicle seat and to adjust the backrest with respect to a seat part of the vehicle seat. In an embodiment, the adjustment system is configured as a mechanical adjustment system. In order to adjust the backrest or the support part, the adjustment system comprises a support adjustment device for adjusting the support part or the backrest position. In order to adjust the seat part of the vehicle seat, the adjustment system comprises a device for adjusting the seat position, abbreviated to the seat adjustment device. The adjustment devices are preferably configured to be separate from each other. Each adjustment device is actuatable independently via the corresponding actuation unit. In order to actuate the adjustment devices, that is to say initiate the adjustment, each of the adjustment devices has at least one actuation unit or operating unit.

The actuation unit includes a lever, a knob, a pushbutton, a handle or the like, which the user can grasp and/or actuate. In one embodiment, the adjustment devices each include one lever-like actuation unit. The actuation unit for the seat adjustment device to adjust the seat part, abbreviated to seat operating unit or seat actuation unit, is arranged beside the seat part and close to the seat adjustment device for adjusting the seat. The seat adjustment device includes a mechanism with which a distance from the seat part to a vehicle floor may be altered or adjusted, more precisely a seat adjustment mechanism. In an embodiment, the seat actuation unit is configured as a lever that is coupled to the mechanism, for example connected directly, for example via a lever arm, such as a bar or the like.

In an embodiment, the actuation unit of the support adjustment device for adjusting the backrest, abbreviated to support operating unit or support actuation unit, is arranged away from an area to the side of the backrest or distant from the support adjustment device for adjusting the backrest. The support adjustment device comprises a mechanism with which an arrangement for immobilizing the backrest relative to the seat part may be released or locked. In a released state, the backrest or the support part may be swiveled about an axis of rotation relative to the seat part, so that a backrest position may be set. In an embodiment, the support actuation unit has the form of a lever that is coupled with the corresponding support adjustment mechanism.

In order to avoid the need for a user to reach around to adjust the vehicle seat repeatedly, the support actuation unit is situated next to the seat actuation unit. The range in which a user actuates the actuation unit, particularly reaches out to actuate the actuation unit, is called the reaching range. According to an embodiment, due to their adjacent arrangement the actuation units form a single reaching range. This means that the user moves his hand towards the reaching range. In the common reaching range, the user decides which lever or actuation unit he wishes to operate, and in so doing does not have to change the position of his hand, at least not significantly. Preferably, the movement of a finger is sufficient to make or change the selection of the actuation unit. The actuation units are arranged next to each other. In this context, in one embodiment the actuation units are arranged with a gap between them so that they can be distinguished more readily and the selection may be made more easily. In another embodiment, the gap has a gap dimension smaller than about 5 cm, for example smaller than about 4 cm, for example less than about 3 cm, for example smaller than about 2 cm, for example smaller than about 1 cm, such as a few millimeters wide. Accordingly, in one embodiment the reaching range is defined as an envelope around the actuation units in which a hand is located when grasping or actuating the actuation units. In one embodiment the various actuation units are constructed identically. In an alternative embodiment, the actuation units are constructed differently so that they may be distinguished more easily. The actuation units preferably at least form a single, common unit for visual purposes.

In an embodiment, the support adjustment device comprises a force transmission device with which a force for locking and unlocking the support adjustment device, more precisely a ratcheted recliner mechanism of the support adjustment device, may be transferred to the ratcheted recliner mechanism. An adjustment of a backrest or support part is effected by applying force to the backrest. In this context, the backrest is preferably biased, so that a biasing force is acting in the direction of an upright seat position and against a reclined position. In an embodiment, in order to pivot the backrest, a force is applied by a user who is sitting on the seat, for example is leaning against the backrest.

In order to prevent the backrest from being shifted inadvertently, the support adjustment device has a locking device or detent that prevents unintentional adjustment. In an embodiment, the detent is in the form of a ratcheted recliner mechanism in which two ratcheted recliner parts cooperate with one another. These are disengaged to enable adjustment, so that seat adjustment may take place. The support adjustment device comprises the ratcheted recliner mechanism. In the locked position, the two ratcheted recliner parts are engaged with one another. In order to enable adjustment, the ratcheted recliner parts are moved apart so that they are no longer engaged with one another. The force or movement necessary for this is transferred via the force transmission device. As the ratcheted recliner parts move relative to one another, there are various intermediate positions between the two end positions or end states—locking or release—during their movement apart. Adjustment is possible in some of these intermediate positions, even though the ratcheted recliner parts are still loosely engaged.

The force transmission device is provided in order to move the ratcheted recliner parts apart, and serves to transmit a force for locking and releasing at least to the ratcheted recliner parts. The force is thus translated into a corresponding relative movement of the ratcheted recliner parts. In an embodiment, in order to use a force that is transmitted via the force transmission device to the ratcheted recliner mechanism such that adjustment only takes place when the ratcheted recliner parts have been moved completely apart, a force multiplication device is provided. The force transmission device is configured to bring about the state in which the ratcheted recliner parts are fully disengaged from one another so that adjustment can be made without the ratcheted recliner parts contacting one another faster and with perceptible feedback to the user.

To this end, in one embodiment the transmission force, which in the related art is transmitted essentially proportionally or linearly to the travel path, is transmitted via the force transmission device, particularly variably. In an embodiment, transmission is degressive so that upon reaching the decoupling point, that is to say the point or state in which the ratcheted recliner parts are completely disengaged from one another, noticeably less force has to be applied to the force transmission device, that is to say corresponding feedback is given to the user. In this context, the support adjustment device is constructed such that the force transmission device runs more easily when the uncoupling point or an uncoupling state has been reached. In one embodiment, one force transmission device is provided. In other embodiments, multiple force transmission devices are provided, for example two, three or more. In one embodiment the multiple force transmission devices are coupled together, for example connected in series or in parallel.

A further embodiment provides for a force multiplication device. Another embodiment provides for multiple force multiplication devices. In one embodiment, the multiple force multiplication devices are coupled, that is connected for example in series or in parallel. In one variation, the force transmission device is in the form of a lever, transmission or similar. This means that the force transmission device includes a multiplication section in which a force is multiplied. However, the force is multiplied independently of an angle or path of the force transmission device, so that a predetermined multiplication ratio is present. The force multiplication device provides an additional force multiplication. In particular, the force multiplication device is configured such that various multiplication ratios are possible. To this end, the force multiplication device is changeable, particularly movable relative to the force transmission device, for example by translation and/or rotation.

In one embodiment, the adjacent actuation units are positioned such that at least portions thereof are aligned and/or flush with each other. In another embodiment, at least one of the surfaces of an operating unit is arranged flush against a corresponding surface of another operating unit. In particular the surfaces facing towards the interior of the vehicle and/or the surfaces that are visible to the user are arranged so as to be aligned and/or flush with each other, thus creating the visual appearance of a single actuation unit. In an area not facing the user, the surfaces are constructed differently, for example, so that they differ haptically, and/or may be differentiated by the user by touch. In one embodiment, all surfaces of the operating units are arranged so that they are aligned and/or flush with each other. In another embodiment, markings, particularly haptic and/or non-optical markings, are provided to differentiate the actuation units. In one embodiment, the actuation units have grip recesses and/or depressions or molded conformations for improved operability. The actuation units are preferably aligned in a lengthwise direction of a vehicle.

In a further embodiment, the actuating units are decoupled from each other, so that the actuating units are operable independently of each other. A gap having a predefined dimension, for example, is provided between the actuating units, which does not impair the optical impression of a combined actuating unit. The actuating units are preferably shaped ergonomically. In particular, the actuating units have a slight curvature. In an embodiment, the actuating units are arranged so as to be rotatable about different axes of rotation.

A further embodiment provides that the actuating units are arranged in the area of the seat adjustment device, more precisely in the area of the seat actuation unit. The seat position adjustment or seat adjustment device is arranged in the area to the side of the seat part so that a user reaches past the seat part in order to actuate the seat adjustment device. The reaching range is thus formed in the area of the seat adjustment device. More precisely, the common reaching range thus corresponds to the reaching range of the seat actuation unit.

In a further embodiment, at least the support actuation unit is arranged between the seat actuation unit and a seat adjustment mechanism of the seat adjustment device that is coupled with the seat actuation unit. The seat actuation unit is coupled directly with the seat adjustment mechanism, for example via a rod or the like. The support actuation unit is arranged between the seat actuation unit and the seat adjustment mechanism. In this way, a small installation space is assured for the actuation units.

Correspondingly, one embodiment provides that a grip member of the support actuation unit is arranged in a mounting in the grip member of the seat actuation unit. The cutaway is preferably configured such that the support actuation unit is aligned and/or flush with the seat actuation unit. The cutaway is open to the side, for example facing the seat part, so that a connection to the rest of the support adjustment device may be provided. The overall appearance is not impaired because the connection is made on the inside Yet in another embodiment, the support adjustment device includes a multiplication unit, which the support adjustment unit is coupled at a distance from an axis of rotation of the support adjustment device. This means that the support adjustment device can be controlled remotely, that is to say it is operable via an actuation unit at a distance from its axis of rotation. The support actuation unit is thus not arranged directly on the axis of rotation of the support adjustment device, but at a significant distance therefrom. Accordingly, in one embodiment, the support adjustment device has the form of a remotely controlled or remotely controllable support adjustment device. The support adjustment device is preferably arrange at least partly in an easily accessible location, away from the axis of rotation and/or the backrest, preferably in the area of the seat actuation unit. The remote controlled support adjustment device is preferably arranged in a location that is easily accessible for a user sitting in the seat, particularly in a grip area of the seat adjustment device.

For a remote-controlled configuration, the force transmission device has a part close to the ratchet mechanism and a part that is distant from the ratchet mechanism. The part that is distant from the ratchet mechanism forms the remotely controllable part of the force transmission device. Both parts of the force transmission device are coupled as necessary for force transmission.

In another embodiment, the support adjustment device has a force bridging device, in order to transmit a force that is applied at a distance from at least one part of the force transmission device that is distant, or distant from the ratchet mechanism, to at least one part of the force transmission device that is close to the ratchet mechanism. This part is for example integrated in the force transmission device. The force transmission device has a part that is close to the ratchet mechanism, and with which a force is transferred to the ratcheted recliner mechanism. For a remotely controlled embodiment, a force transmission part is provided that is distant from the recliner ratchet mechanism. This may be attached at any location that is distant from the part of the force transmission device that is close to the ratchet mechanism.

Accordingly, one embodiment provides that the multiplication unit is configured as or has the form of a transmission unit, particularly a linkage mechanism. The linkage mechanism is optimally designed to transmit a force from a remote support actuation device to the ratcheted recliner mechanism or the like. In one embodiment, it is provided that the force transmission device, configured as a transmission unit, more precisely as a linkage and/or cam drive mechanism, comprises a lever unit that is rotatable about an axis of rotation for transmitting force. The rotatable lever unit is rotatable about the axis of rotation of the support adjustment device, and is preferably coupled non-rotatably with the axis of rotation. In an embodiment, at least two lever units are provided, each being rotatable about an axis of rotation, one being close to the ratcheted mechanism and one being distant therefrom. The lever unit that is distant from the ratcheted mechanism, or close to the actuating unit, is attached rotatably via an axis of rotation arranged of a seat part. The handle of the support actuation device is coupled, particularly connected non-rotatably, to the second lever unit.

In one embodiment, the lever unit is adapted to the seat adjustment mechanism of the seat adjustment device so that it does not interfere with the action of the seat adjustment mechanism. The second lever unit is preferably curved. One end of the actuating handle is connected to the second lever unit. The other end of the second lever unit is connected rotatably to the second axis of rotation. The second lever unit is equipped between the two ends thereof with a rotatable coupler. One end of the coupler is connected rotatably to the second lever unit. The other end of the coupler is connected to the end of the first lever unit that is farthest from the axis of rotation. This forms a linkage mechanism that enables the support actuation device to be arranged remotely with respect to the axis of rotation of the support adjustment device. More precisely, the transmission unit enables the support actuation device to be arranged in an area of the seat actuation unit, more precisely in a reach area of the seat actuation area. The configuration as a rotatable lever unit requires minimal installation space and is very compact. The force path is directed through an angle of rotation in space-saving manner by twisting.

In another embodiment, a vehicle seat, particularly a vehicle seat having an adjustable seat part and a support part that is adjustable relative to the seat part, particularly a backrest part, comprises an adjustment arrangement for adjusting the support part and the seat part. The adjustment arrangement is configured as the adjustment system described above. In one embodiment, the vehicle seat is configured as a single seat. In another embodiment, the vehicle seat is configured as a bench seat. In one embodiment, the bench seat has a divided backrest, the parts of which may be adjusted separately and/or together via an adjustment device as described in the preceding. A part of the force transmission device close to the ratcheted recliner mechanism is conformed on the vehicle seat. The part of the force transmission device distant from the ratcheted recliner mechanism is arranged at a distance from the ratcheted recliner mechanism, for example in a reach area of the seat actuation unit.

In a further embodiment, a motor vehicle, particularly a motor car that comprises a seat unit for a vehicle occupant is provided. The seat unit is configured as a vehicle seat as described above. The vehicle may be a limousine, an estate car, a coupe, a sport utility vehicle, a (mini)van or the like.

In yet another embodiment, a method for repeated adjustment of a vehicle seat with the aid of an adjustment system, particularly via a discontinuous support adjustment device for adjusting a backrest position and a seat adjustment device for adjusting a seat position of the vehicle seat, is provided. The method includes the steps of actuating the seat actuation unit and/or actuating the support actuation unit for adjusting the vehicle seat. The actuation is performed in a common reach area. In order to actuate the actuation units, the user moves his hand in a common reach area of the seat actuation unit and the support actuation unit. Without leaving the reach area, the user selects the actuation unit that he wishes to operate. The support actuation device is pulled towards the user in order to adjust the backrest. This action releases the support adjustment device so that the user is able to adjust the backrest against a biasing force. The seat actuation unit is either pulled towards the user or is pushed away from the user, towards the vehicle floor. In this way, a corresponding force and/or movement is transmitted to the seat adjustment mechanism of the seat adjustment device. Depending on the actuation, this raises or lowers the seat part relative to the vehicle floor. Both actuation units are restored to an initial state after actuation.

In one embodiment, upon actuation of the support actuation device a force is transmitted to an axis of rotation of the support adjustment device via a multiplication unit in order to adjust the backrest position.

When the backrest position of the vehicle seat is adjusted by means of a discontinuous support adjustment device, a force for locking and releasing a ratcheted recliner mechanism of the support adjustment device is transmitted to the ratcheted recliner mechanism via a force transmission device. It is provided that the transmission includes the step of at least temporary multiplication, particularly variable multiplication of the force that is to be transmitted by the force transmission device. Transmission to a part is assured via a transmission unit, particularly a linkage mechanism. In order to render a point in time when the ratcheted recliner mechanism is completely disengaged clearly perceptible to a user, it is provided to multiply the force transmission at least temporarily, so that at least one change in a force path curve occurs. In particular, it is provided that the force to be applied in order to release the adjustment device is significantly reduced at the point of complete disengagement of the ratcheted recliner parts. Accordingly, the multiplier is designed such that a resistance is reduced noticeably as soon as the disengagement point is reached.

Therefore, one embodiment particularly provides that the multiplication consists at least in part of degressive multiplication. This causes a linear force path curve or a rising force path curve to assume a falling curve when degressive multiplication is implemented.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

FIGS. 1 to 10 show various views of an embodiment of an adjustment system 1 in various levels of detail. Adjustment system 1 comprises a support part 10, or backrest part, and a seat part 20. Backrest part 10 and seat part 20 are connected to and with one another in folding manner via a support adjustment device 100. Seat part 20 is connected to a seat adjustment device 200 for adjusting the height of seat part 20. Each of the two adjustment devices 100, 200 has an actuating unit 110, 210. Support adjustment device 100 comprises a support actuation unit 110. Seat adjustment device 200 comprises a seat actuating unit 210. The mode of operation and the components of adjustment system 1 will be described in detail in the following. In so doing, the same reference marks will be used to designate identical or similar components. For the sake of clarity, a detailed description of parts that have already been described will not be given.

Figures 1, 2, 3, 4, 5:
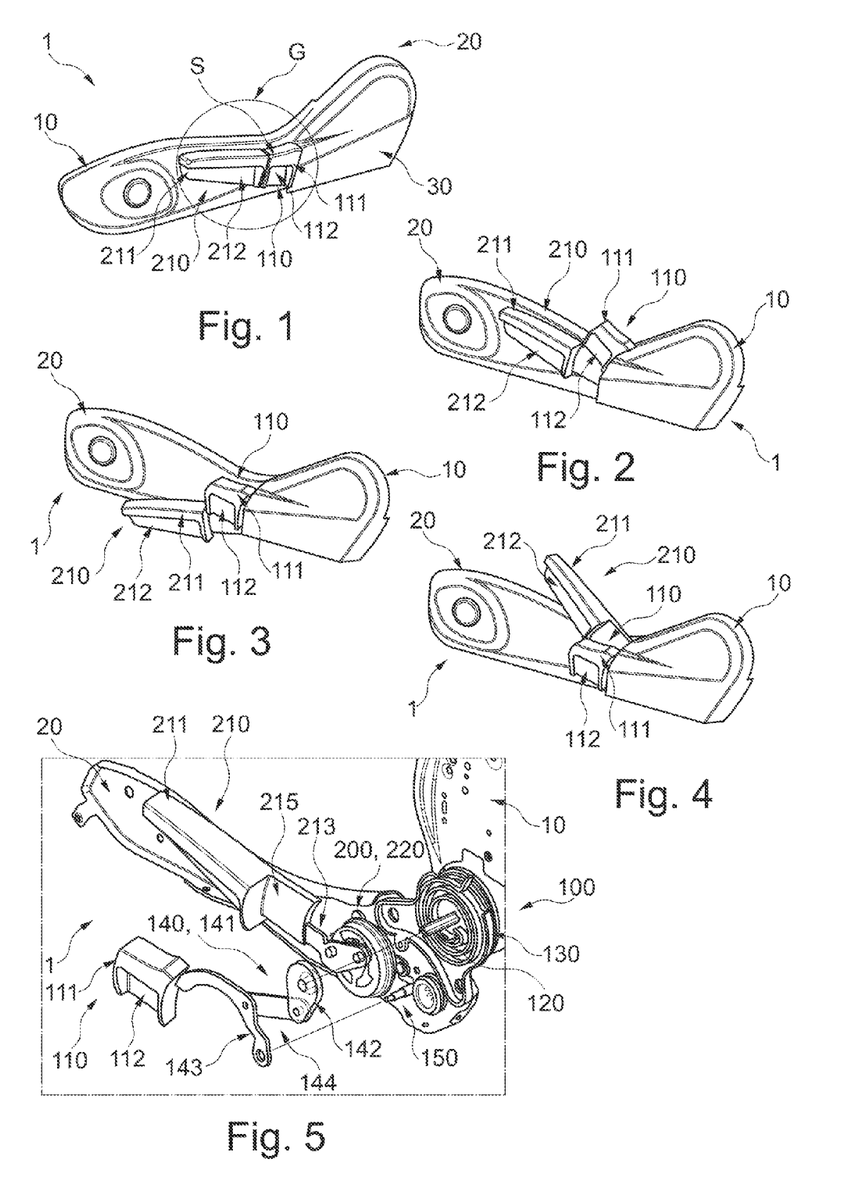
FIG. 1 is a diagrammatic, perspective view of a section of an adjustment system having two adjacently arranged actuation units, each in its initial state, in accordance with an exemplary embodiment.
FIG. 2 is a different diagrammatic, perspective view of the adjustment system of FIG. 1 with a support actuation device in an actuation position, in accordance with an exemplary embodiment.
FIG. 3 is a diagrammatic, perspective view of a section of the adjustment system of FIG. 1 with a seat actuation unit in a first actuation position, in accordance with an exemplary embodiment.
FIG. 4 is a diagrammatic, perspective view of a section of the adjustment system of FIG. 1 with a seat actuation unit in a second actuation position, in accordance with an exemplary embodiment.
FIG. 5 is a diagrammatic, perspective, exploded view of a section of the adjustment system, in accordance with an exemplary embodiment.

FIG. 1 is a diagrammatic, perspective view of a section of the adjustment system 1 having two adjacently arranged actuation units 110, 210, each in its initial state. A first actuation unit is configured as a support actuation unit 110. A second actuation unit is configured as a seat actuation unit 210. Actuation units 110, 210 are each connected to a corresponding adjustment mechanism, which is not shown here because it is concealed by a panel 30. The two actuation units 110, 210 shown are arranged adjacent to one another. In this configuration, actuation units 110, 210 are arranged in a common reach area G for a user. Reach area G corresponds to the area a user's hand occupies in order to actuate the actuation units 110, 210. In this embodiment, actuation unit 110, 210 are arranged in a reach area of seat actuating unit 210. This means that the position of actuation units 110, 210 is located to one side in the area of seat part 20, more precisely beside seat part 20. Support actuation unit 110 is arranged at a distance from an axis of rotation of support adjustment device 100 (not shown here). Since actuation units 110, 210 are arranged adjacent to one another, in order to adjust a support position, in other words to fold a support part 10 (only represented diagrammatically here) the user does not have to switch from reach area G in order to adjust a vehicle seat. In this context, actuation units 110, 210 are arranged such that they provide the visual impression of a single, common actuation unit with two actuation sections. Actuation units 110, 210 are configured as elongated levers with a handle part 111, 211, which are aligned with each other. This means that seat actuating unit 210 is located in an extension of support actuation unit 110. As is shown, actuation unit 110, 210 and handle parts 111, 211 thereof are configured in alignment with each other. Except for a gap S with predetermined dimension arranged between actuation units 110, 210 to allow separate actuation, the contours of actuation units 110, 210 flow smoothly together to form a uniform surface facing toward the user. In the embodiment shown here, the gap dimension is of a few millimeters. On the underside, actuation units 110, 210, more precisely the handles, grasp parts or grasp sections 111, 211 thereof are furnished with cutaways 112, 212, which are designed as a grasp recess to improve holding and/or to provide a haptic distinction between actuation units 110, 210. The two actuation units 110, 210 shown are represented in their respective starting situation or starting position. A further description of actuation units 110, 210 is provided in the following FIGS. 2 to 4.

FIG. 2 is a different diagrammatic, perspective view of the adjustment system of FIG. 1 with support actuation unit 110 in an actuation position. Support actuation unit 110 is configured to be movable in a direction towards the user, that is to say away from the vehicle floor in order to make the adjustment. In order to adjust the backrest or the support part, support actuation unit 110 is pulled towards the user, as shown in FIG. 2. In this position, the backrest is adjustable, that is to say support adjustment unit 110 is released. Seat actuating unit 210 is in a starting position.

FIG. 4 is a diagrammatic, perspective view of the adjustment system 1 of FIG. 1 with seat actuation unit 210 in a first actuation position. Support actuation unit 110 is in the starting position. Seat actuating unit 210 is movable both in a direction towards the vehicle floor, not shown here, and in an opposite direction, towards a user. This movement is limited for example by a limit stop. In the position shown here, seat actuating unit 210 is moved towards the user in order to raise seat part 20.

FIG. 3 is a diagrammatic, perspective view of the adjustment system 1 of FIG. 1 with seat actuation unit 210 in a second actuation position. Support actuation unit 110 is in the starting position. In the position shown here, seat actuating unit 210 has been moved towards the vehicle floor, that is to say away, from the user, to lower seat part 20. Actuation units 110, 210 may be restored to their starting positions by their respective return m FIG. 5 is a diagrammatic, perspective, exploded view of a section of adjustment system 1. Adjustment system 1 comprises support part 10 and seat part 20, which are connected to one another in folding manner via support adjustment device 100. Support part 10 may be configured as a backrest, as a bearing structure for a backrest, or as an adapter part for a backrest, or as a combination thereof. Seat part 20 may be configured as a bearing structure of a seat, as a seat shell or an adapter for a seat, or as a combination thereof. Support part 10 is arranged rotatably about a fixed axis of rotation 120 of support adjustment device 100. Support actuation unit 110 is provided, and is coupled to support adjustment mechanism 130 in order to actuate support adjustment device 100.

Seat part 20 is adjustable in respect of a seat height. In an embodiment, seat adjustment device 200 is provided for this purpose. Seat adjustment device 200 comprises a seat adjustment mechanism 220, which is actuatable via seat actuation unit 210. Seat actuation unit 210 comprises handle part 211, which is coupled with seat adjustment mechanism 220 via a lever 213. A spring 230, in this case in the form or a torsion or leg spring, is provided on seat adjustment mechanism 220 and always returns seat actuating unit 210 to the starting position thereof.

In order to enable support actuation unit 110 to be arranged in the area of seat actuation unit 210, a multiplication unit 140 is provided in the form of a transmission unit 141. Transmission unit 141 comprises a first lever unit 142, which is arranged on axis of rotation 120 and is attached in non-rotating manner thereto. Transmission unit 141 further comprises a second lever unit 143, one end of which is arranged rotatably on an axis of rotation that is formed immovably on seat part 20. The other end of second lever unit 143 is connected to handle part 111 of support actuation unit 110. Second lever unit 143 is furnished with a coupler 144 between the two ends thereof. One end of coupler 144 is connected rotatably to first lever unit 142 and the other end thereof is connected rotatably to second lever unit 143. Thus, transmission unit 141 functions as a linkage mechanism that enables support actuation unit 110 to be arranged at a distanced from axis of rotation 120 of support adjustment device 100.

For the adjacent arrangement of actuation units 110, 210, seat actuation unit 210 has a corresponding seating 215. This corresponds to the shape of support actuation unit 110, so that it is positioned in alignment and/or flush when fitted in seating 215.

Figure 6:
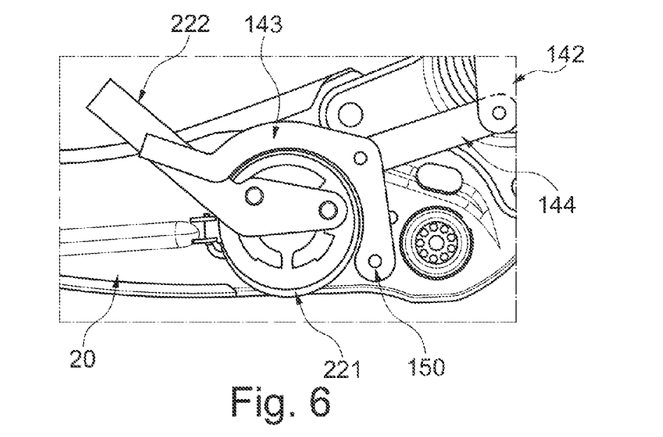
FIG. 6 is a diagrammatic side view of a section of the adjustment system, in accordance with an exemplary embodiment.

FIG. 6 is a diagrammatic side view of a section of adjustment system 1. This shows clearly how second lever unit 143 is curved around a part of seat adjustment mechanism 220, more precisely a wheel part 221 of seat adjustment mechanism 210. Second lever unit 143 is arranged in an area adjacent to lever 213 of seat actuating unit 210.

Figure 7:
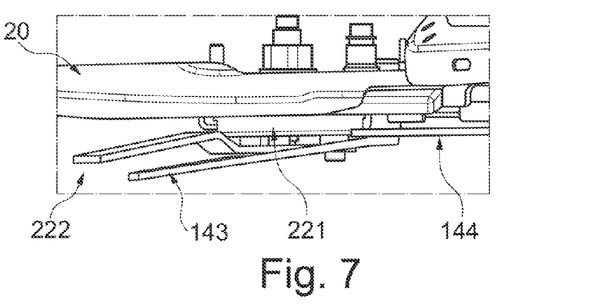
FIG. 7 is a diagrammatic plan view of the section of the adjustment system of FIG. 6, in accordance with an exemplary embodiment.

FIG. 7 is a diagrammatic plan view of the section of adjustment system 1 of FIG. 6. As is shown here, actuation units 110, 210, more precisely second lever unit 143 and lever unit 213 are offset laterally with respect to one another, so that both actuation units 110, 210 are operable separately from one another. In this context, the two actuation units 110, 210 at least with handle sections 111, 211 are located in common reach area G. This construction enables a compact configuration of adjustment system 1.

Figure 8:
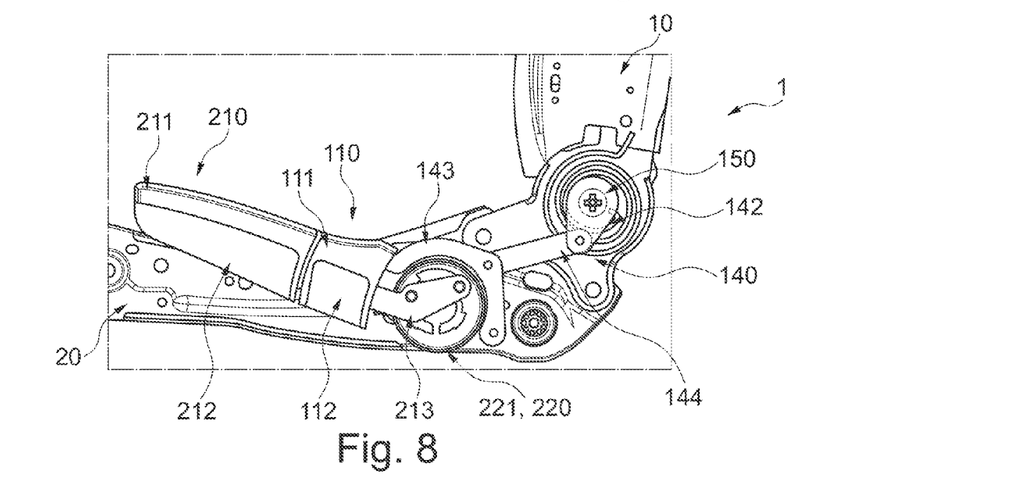
FIG. 8 is a diagrammatic side view of the section of FIG. 5 with both actuation units in a starting state, in accordance with an exemplary embodiment.
Figure 9:
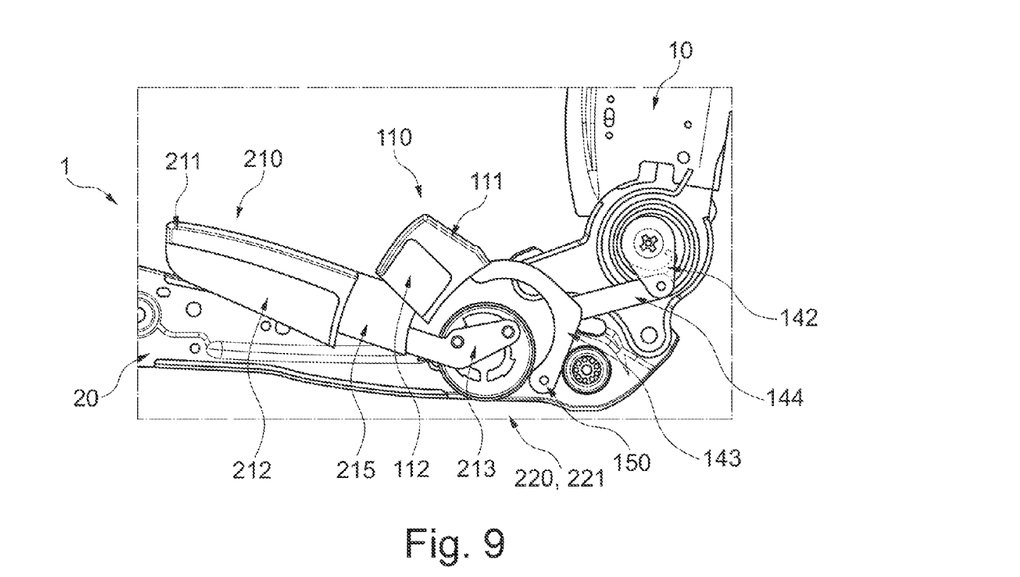
FIG. 9 is a diagrammatic side view of the section of FIG. 8 with the support actuation device in an operating position, in accordance with an exemplary embodiment.
Figure 10:
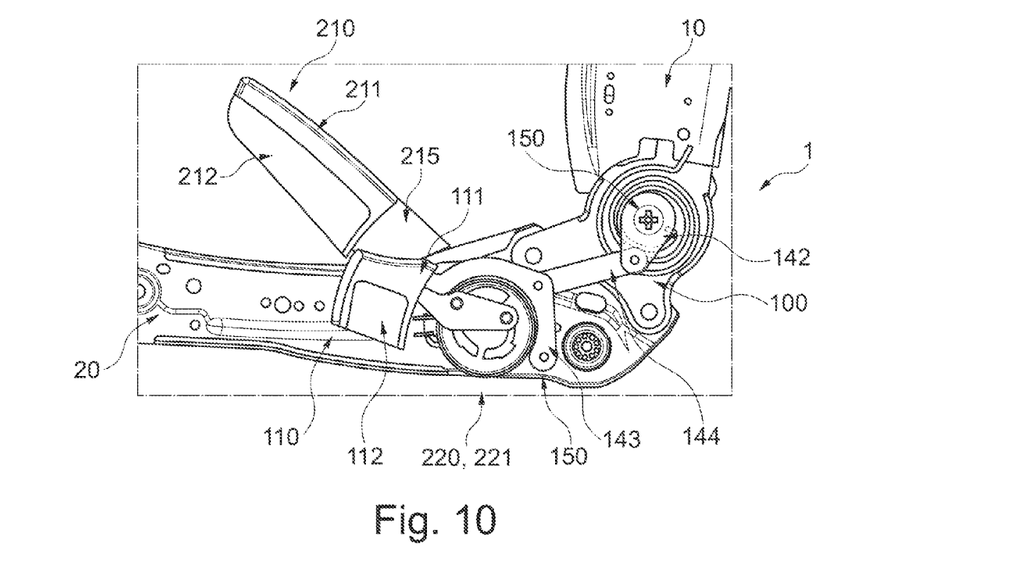
FIG. 10 is a diagrammatic side view of the section of FIGS. 8 and 9 with the seat actuation unit in a second operating position, in accordance with an exemplary embodiment.

FIGS. 8 to 10 show how actuation units 110, 210 are actuated for the purpose of adjusting the vehicle seat.

FIG. 8 is a diagrammatic side view of the section of FIG. 5 with both actuation units 110, 210 in a starting state. In order to adjust the vehicle seat, the user actuates the corresponding actuation unit 110, 210. In FIG. 9, support actuation unit 110 has been actuated in order to adjust the backrest or support part 10. In FIG. 10, seat actuation unit 210 has been actuated in order to raise seat part 20.

FIG. 9 is a diagrammatic side view of the section of FIG. 8 with support actuation unit 110 in an operating position. In this situation, handle section 111 of support actuation unit 110 pivots about second axis of rotation 150 of support adjustment device 100. The movement of second lever unit 143 required for this is transmitted to first lever 142 via coupler 144. This rotates correspondingly about and with axis of rotation 120. Since first lever unit 142 is attached in non-rotating manner to axis of rotation 120, it is also rotated. In this way, support adjustment device 100 is released and support part is adjustable against the force of a biasing spring.

FIG. 10 is a diagrammatic side view of the section of FIGS. 8 and 9 with seat actuation unit 210 in a second operating position. In this second position, seat actuation unit 210 is swiveled away from a vehicle floor. The rotary motion required for this is transmitted to caster wheel 221 via lever 213. In order to assure this transmission, lever 213 is coupled to caster wheel 221 via pin or screw connections. Caster wheel 221 causes a transmission to the other part of seat adjustment device 200 and the height of the vehicle seat is adjusted, particularly discontinuously, via a pump.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An adjustment system for repeated adjustment of a vehicle seat having a seat part and a support element, the adjustment system comprising:
a seat actuation unit for adjusting a seat position of the seat part;
a support actuation unit for adjusting a support position of the support element; and
a multiplier unit that transmits a force received from the support actuation unit to adjust the support position of the support part, the multiplier unit including a first lever unit having a first end attached to an axis of rotation of a support adjustment device and a second end, a second lever unit having a first end coupled to the support actuation unit and a second end attached rotatably to an axis of rotation formed immovably on the seat part, and a coupler coupled rotatably to the second end of the first lever unit and coupled to the second lever unit,
wherein the seat actuation unit and the support actuation unit are arranged in a common reach area and are positioned next to each other.

2. The adjustment system according to claim 1, wherein the support adjustment device for adjusting the support element is discontinuous, and a seat adjustment device for adjusting the seat part of a driver's seat.

3. The adjustment system according to claim 1, wherein the seat actuation unit and the support actuation unit are positioned so that at least parts thereof are aligned and/or flush with one another.

4. The adjustment system according to claim 1, wherein the seat actuation unit and the support actuation unit are decoupled from one another so that the seat actuation unit and the support actuation unit are operable separately from one another.

5. The adjustment system according to claim 1, wherein the seat actuation unit and the support actuation unit are arranged in an area of the seat actuation unit.

6. The adjustment system according to claim 1, wherein at least the support actuation unit is arranged between the seat actuation unit and a seat adjustment mechanism of a seat adjustment device coupled to the seat actuation unit.

7. The adjustment system according to claim 1, wherein a handle part of the support actuation unit is arranged in a mounting of a handle part of the seat actuation unit.

8. A vehicle seat with an adjustable seat part and a support part that is adjustable with respect to the adjustable seat part, the vehicle seat having an adjustment arrangement for adjusting the support part and the adjustable seat part, and the adjustment arrangement comprises:
a seat actuation unit for adjusting a seat position of the adjustable seat part;
a support actuation unit for adjusting a support position of the support part; and
a multiplier unit that transmits a force received from the support actuation unit to adjust the support position of the support part, the multiplier unit including a first lever unit having a first end attached to an axis of rotation of a support adjustment device and a second end, a second lever unit having a first end coupled to the support actuation unit and a second end attached rotatably to an axis of rotation formed immovably on the seat part, and a coupler coupled rotatably to the second end of the first lever unit and coupled to the second lever unit,
wherein the seat actuation unit and the support actuation unit are arranged in a common reach area and are positioned next to each other.

9. A vehicle with a seat unit for a vehicle occupant, wherein the seat unit has an adjustable seat part, a support part that is adjustable with respect to the adjustable seat part, and an adjustment arrangement for adjusting the adjustable seat part and the support part, and the adjustment arrangement comprises:
a seat actuation unit for adjusting a seat position of the adjustable seat part;
a support actuation unit for adjusting a support position of the support part; and
a multiplier unit that transmits a force received from the support actuation unit to adjust the support position of the support part, the multiplier unit including a first lever unit having a first end attached to an axis of rotation of a support adjustment device and a second end, a second lever unit having a first end coupled to the support actuation unit and a second end attached rotatably to an axis of rotation formed immovably on the seat part, and a coupler coupled rotatably to the second end of the first lever unit and coupled to the second lever unit, wherein the seat actuation unit and the support actuation unit are arranged in a common reach area and are positioned next to each other.

10. The vehicle according to claim 9, wherein the vehicle is a motor car.

11. A method for repeated adjustment of a vehicle seat using an adjustment system with a discontinuous support adjustment device for adjusting a backrest position and a seat adjustment device for adjusting a seat position of the vehicle seat, the method comprising the steps of:
   actuating a seat actuation unit of the adjustment system and/or actuating a support actuation unit of the adjustment system to adjust the vehicle seat,
   transmitting a force via a multiplier unit to an axis of rotation of a support adjustment device for adjusting a backrest position, the multiplier unit including a first lever unit having a first end attached to the axis of rotation of the support adjustment device and a second end, a second lever unit having a first end coupled to the support actuation unit and a second end attached rotatably to an axis of rotation formed immovably on the seat part, and a coupler coupled rotatably to the second end of the first lever unit and coupled to the second lever unit,
   wherein actuating takes place in a common reach area.

12. The method according to claim 11, wherein the force is transmitted unevenly.

* * * * *